(12) United States Patent
Yang et al.

(10) Patent No.: US 10,320,274 B2
(45) Date of Patent: Jun. 11, 2019

(54) COMBINATION STRUCTURE BETWEEN STATOR AND ROTOR IN A BRUSHLESS MOTOR

(71) Applicant: Bergstrom, Inc., Rockford, IL (US)

(72) Inventors: Kuilin Yang, Changzhou (CN); Gengxiang Li, Changzhou (CN); Lei Wang, Changzhou (CN)

(73) Assignee: BERGSTROM, INC., Rockford, IL (US)

( * ) Notice: Subject to any disclaimer, the term of this patent is extended or adjusted under 35 U.S.C. 154(b) by 269 days.

(21) Appl. No.: 15/210,517

(22) Filed: Jul. 14, 2016

(65) Prior Publication Data

US 2017/0018980 A1 Jan. 19, 2017

(30) Foreign Application Priority Data

Jul. 16, 2015 (CN) .......................... 2015 1 0420866

(51) Int. Cl.
*H02K 21/12* (2006.01)
*H02K 29/03* (2006.01)
(Continued)

(52) U.S. Cl.
CPC ............ *H02K 29/03* (2013.01); *H02K 1/2766* (2013.01); *H02K 1/146* (2013.01); *H02K 2201/03* (2013.01); *H02K 2213/03* (2013.01)

(58) Field of Classification Search
CPC ......... H02K 21/24; H02K 1/274; H02K 1/146
(Continued)

(56) References Cited

U.S. PATENT DOCUMENTS 4,998,032 A 3/1991 Burgbacher
6,021,043 A 2/2000 Horng
(Continued)

FOREIGN PATENT DOCUMENTS

CN 2715414 Y 8/2005
CN 201352754 Y 11/2009
(Continued)

OTHER PUBLICATIONS

International Search Report and Written Opinion issued in related technology International Patent Application No. PCT/US2016/042329 dated Sep. 30, 2016.
(Continued)

*Primary Examiner* — Hanh N Nguyen
(74) *Attorney, Agent, or Firm* — Morgan Lewis & Bockius LLP

(57) ABSTRACT

A brushless motor includes a stator having stator core and winding teeth evenly distributed on the stator core; and a rotor rotatably disposed within the stator with the winding teeth facing the rotor, where the rotor has a rotor core and magnets evenly distributed around the rotor core. A first symmetry axis is defined passing through a center of a one of the magnets to a center of the rotor, and a second symmetry axis is defined passing between adjacent magnets to the center of the rotor. A first distance between the outer surface of the rotor to a surface of a winding tooth when the first axis is aligned with the winding tooth is smaller than a second distance between the outer surface of the rotor to the surface of the winding tooth when the second axis is aligned with the winding tooth.

19 Claims, 5 Drawing Sheets

(51) Int. Cl.
*H02K 1/27* (2006.01)
*H02K 1/14* (2006.01)

(58) Field of Classification Search
USPC ......... 310/156.01–156.84, 216.092, 216.094
See application file for complete search history.

(56) References Cited

U.S. PATENT DOCUMENTS

| | | | |
|---|---|---|---|
| 6,072,261 A | 6/2000 | Lin | |
| 6,232,687 B1 | 5/2001 | Hollenbeck et al. | |
| 6,992,419 B2 | 1/2006 | Kim et al. | |
| 7,135,799 B2 | 11/2006 | Rittmeyer | |
| 7,385,323 B2 | 6/2008 | Takahashi et al. | |
| 7,683,518 B2* | 3/2010 | Yoshikawa | H02K 1/276 310/156.53 |
| 7,821,175 B2 | 10/2010 | Ionel et al. | |
| 7,932,658 B2 | 4/2011 | Ionel | |
| 8,492,948 B2 | 7/2013 | Wang et al. | |
| 8,664,826 B2* | 3/2014 | Krotsch | H02K 1/146 310/156.46 |
| 8,841,813 B2 | 9/2014 | Junak et al. | |
| 2002/0130574 A1 | 9/2002 | Takahata et al. | |
| 2003/0107290 A1 | 6/2003 | DeFilippis | |
| 2005/0062354 A1 | 3/2005 | Iles-Klumpner | |
| 2007/0103014 A1 | 5/2007 | Sumiya et al. | |
| 2007/0200447 A1 | 8/2007 | Adaniya et al. | |
| 2009/0140590 A1 | 6/2009 | Hung | |
| 2010/0127591 A1 | 5/2010 | Court et al. | |
| 2010/0213780 A1* | 8/2010 | Lee | H02K 1/2766 310/156.53 |
| 2011/0012465 A1* | 1/2011 | Kawamura | H02K 1/276 310/156.53 |
| 2011/0050022 A1* | 3/2011 | Li | H02K 1/276 310/156.46 |
| 2013/0181556 A1 | 7/2013 | Li et al. | |
| 2014/0028148 A1 | 1/2014 | Shelton et al. | |

FOREIGN PATENT DOCUMENTS

| | | |
|---|---|---|
| CN | 201388090 Y | 1/2010 |
| CN | 202034840 U | 11/2011 |
| CN | 103516165 A | 1/2014 |
| CN | 203691194 U | 7/2014 |
| CN | 104467226 A | 3/2015 |
| CN | 105071563 A | 11/2015 |
| CN | 105186726 A | 12/2015 |
| CN | 204886616 U | 12/2015 |
| DE | 19942029 A | 3/2001 |
| JP | 2005033941 A | 2/2005 |
| JP | 2005-210826 A | 8/2005 |
| JP | 2006-197786 A | 7/2006 |
| JP | 2010-183772 A | 8/2010 |
| JP | 2013-192294 A | 9/2013 |
| JP | 5334404 B2 | 11/2013 |
| JP | 5513059 B2 | 4/2014 |
| JP | 2014-107924 A | 6/2014 |
| JP | 2014-230444 A | 12/2014 |
| KR | 10-2010-0005737 A | 1/2010 |

OTHER PUBLICATIONS

International Search Report and Written Opinion issued in related technology International Patent Application No. PCT/US2016/042314 dated Sep. 30, 2016.
International Search Report and Written Opinion issued in counterpart International Patent Application No. PCT/US2016/042326 dated Sep. 27, 2016.
International Search Report and Written Opinion issued in related technology International Patent Application No. PCT/US2016/042307 dated Jul. 10, 2016.
Tyco Electronics Corporation, "MAG-MATE Connector With Multispring Pin," https://datasheet.octopart.com/1247003-2-TE-connectivity-datasheet-14918754.pdf, Jan. 2013.
Office Action dated Apr. 1, 2017 and Supplemental Search Report dated Dec. 6, 2017 from the State Intellectual Property Office of the People's Republic of Chine in related Chinese Application No. 201510420866.2.
Communication dated Jan. 28, 2019 from the European Patent Office in related European application No. 16825197.3.

* cited by examiner

US 10,320,274 B2

1

COMBINATION STRUCTURE BETWEEN STATOR AND ROTOR IN A BRUSHLESS MOTOR

The present invention claims the benefit of Chinese Patent Application No. 201510420866.2, filed in the People's Republic of China on Jul. 16, 2015, which is hereby incorporated by reference.

In addition, Chinese Application Nos. 201510419131.8, 201510420136.2, and 201510420854.X, all of which filed on Jul. 16, 2015, are hereby incorporated by reference.

BACKGROUND OF THE INVENTION

Field of the Invention

The present invention relates to a motor, and more particularly, to a brushless motor having a stator combined with a rotor.

Technology Background

A motor may comprise a rotor having a plurality of magnets and a stator having a core and a winding on the core defining a plurality of coils. Such motors may be divided into fractional-slot winding motors and integral slot winding motors depending on the winding configuration in the winding. A fractional-slot winding motor greatly reduces slot area occupied by an insulation bracket, thereby improving a slot fill factor of the winding, reducing winding resistance, and improving motor efficiency.

However, in a related art fractional-slot winding motor, the armature reaction has increased amounts of higher harmonics, which leads to the increase of motor iron loss. Further, the asymmetry of magnetic circuit easily causes partial magnetic saturation, which leads to motor vibration and increased noise.

SUMMARY

Accordingly, the present invention is directed to a brushless motor that substantially obviates one or more of the problems due to limitations and disadvantages of the related art.

An object of the present invention is to provide a brushless motor with reduced motor cogging torque and torque ripple during operation while controlling sharp change and saturation level of flux that passes through stator tooth tip.

Another object of the present invention is to provide a brushless motor with reduced radial electromagnetic force amplitude.

Another object of the present invention is to provide a brushless motor with reduced vibration and noise.

Another object of the present invention is to provide a brushless motor in which a motor back electromotive force is substantially a sine wave, thereby reducing motor harmonic current and motor iron loss.

Another object of the present invention is to provide a brushless motor with high efficiency that can be easily manufactured.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a brushless motor comprises a stator including stator core and a plurality of winding teeth evenly distributed on the stator core; and a rotor rotatably disposed within the stator with the winding teeth facing the rotor, the rotor including a rotor core and a plurality of magnets evenly distributed around the rotor core; wherein a first symmetry axis is defined passing through a center of a first one of the magnets to a center of the rotor, and a second symmetry axis is defined passing between adjacent ones of the magnets to the center of the rotor, and wherein a first distance between the outer surface of the rotor to a surface of a first one of the winding teeth when the first axis is aligned with the first winding tooth is smaller than a second distance between the outer surface of the rotor to the surface of the first winding tooth when the second axis is aligned with the first winding tooth.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, examples of which are illustrated in the accompanying drawings.

As will be described, a brushless motor may comprise a stator and a rotor. The stator may include a stator core, which may have at a tooth portion facing the rotor. The tooth portion may have a plurality of teeth distributed evenly along the stator core described herein. A winding may be provided on the tooth portion. The rotor may include a rotor core and multiple magnets. For example, there may be a plurality of mounting slots distributed evenly along the circumference direction of the rotor core, and each mounting slot may have a magnet, such as a permanent magnet, therein. A first axis of symmetry herein may pass through a middle of one of the magnets to a center of the rotor. A second axis of symmetry may pass between adjacent ones of the magnets to the center of the rotor. A distance is defined from the point on a contour line of the end face of the rotor to a side wall of the adjacent tooth portion. As the motor rotates, this distance gets smaller as the motor rotates from the second axis to the first axis. The change in this distance may effectively reduce cogging torque and torque ripple during operation while also restraining sharp change and saturation level of flux that pass through stator tooth tip. Further, radial electromagnetic force amplitude is reduced, thereby efficiently controlling motor vibration and noise. In addition, motor back electromotive force is caused to be a sine wave, thereby reducing motor harmonic current and motor iron loss.

Figure 1:
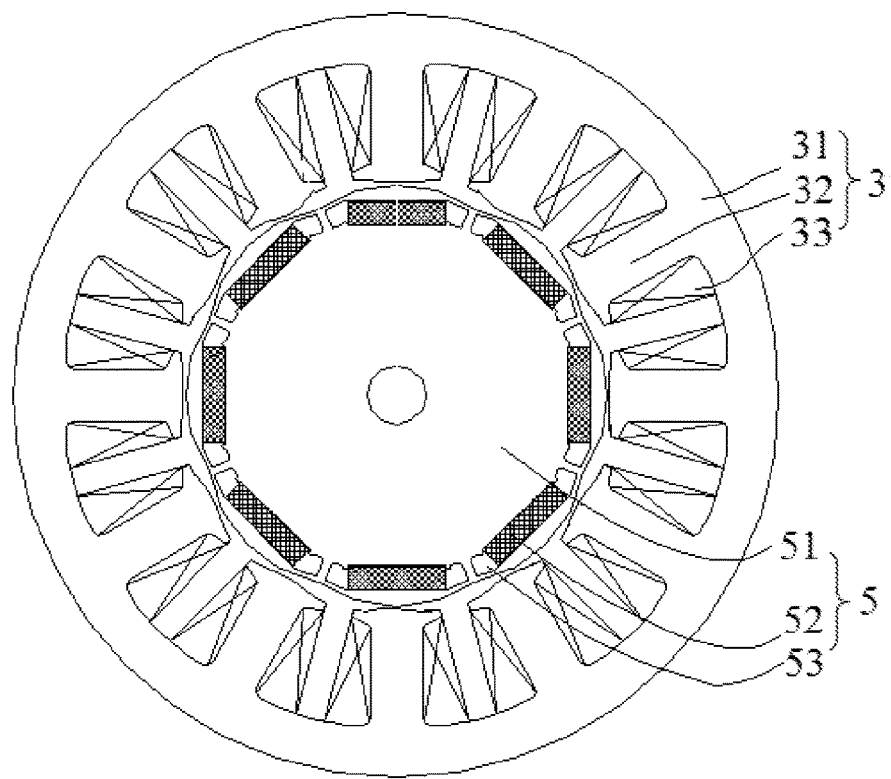
FIG. 1 is a diagrammatic view of a stator and rotor combination in a brushless motor according to an example embodiment.
Figure 2:
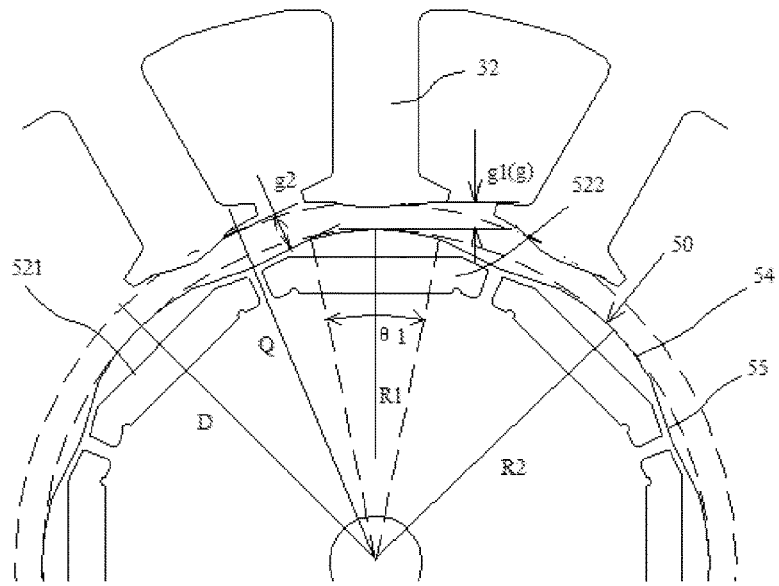
FIG. 2 is a partial diagrammatic view showing the stator and rotor combination of FIG. 1 in greater detail.

FIG. 1 is a diagrammatic view of a stator and rotor combination in a brushless motor according to an example embodiment. FIG. 2 is a partial diagrammatic view showing the stator and rotor combination of FIG. 1 in greater detail.

In the example embodiment of FIG. 1, a motor comprises stator 3 and rotor 5. The stator 3 includes a stator core 31, a plurality of winding teeth 32, which are evenly distributed on the stator core, and a winding 33 on each respective winding tooth 32. The winding teeth are position on the stator core 31 to face the rotor 5.

The rotor 5 includes a rotor core 51 and a plurality of magnets 52, which are provided in corresponding ones of a plurality assembly slots 53 distributed evenly along an outer surface of the rotor core 51. Each magnet 52 may be separately inserted into a respective assembly slot 53. Here, the magnets 52 may be permanent magnets.

With reference to FIG. 2, the plurality of magnets 52 are provided adjacent to each other along the circumference of the rotor core 51. For example, a first magnet 521 and a second magnet 522 are adjacent to each other. A first symmetry axis D is defined passing through a center of the first magnet 521 to the center of the rotor 5. A second symmetry axis Q is defined passing between the first magnet 521 and the second magnet 522 to the center of the rotor 5. A distance g is defined from a point on the outer surface 50 of the rotor 5 to a side wall of an adjacent winding tooth 32.

The stator 3 and the rotor 5 have a configuration such that the separation distance is not constant around their interface. For example, as the motor rotates from a state with the second axis Q aligned with the winding tooth 32 to a state with the first axis D aligned with the winding tooth, the distance g becomes smaller. Because the plurality of the magnets 52 are the same, the first magnet 521 and the second magnet 522 can be any two adjacent magnets among the plurality of magnets 52. Specifically, the distance from the outer surface 50 of the rotor 5 end to a side wall of an adjacent winding tooth 32 will be the smallest when the rotor 5 is rotated to have a point corresponding to a middle of one of the magnets 52 facing the adjacent winding tooth 32.

In the above stator and rotor combination structure, the stator 3 includes a stator core 31, a plurality of winding teeth 32, which are evenly distributed on the stator core, and a winding 33 on each respective winding tooth 32. The winding teeth 32 are positioned on the stator core 31 to face the rotor 5. The rotor 5 includes a rotor core 51 and a plurality of magnets 52. The plurality of magnets 52 includes the first magnet 521 and the second magnet 522, which are adjacent to each other. The first symmetry axis D is defined passing through a center of the first magnet 521 to the center of the rotor 5, the second symmetry axis Q is defined passing between the first magnet 521 and the second magnet 522 to the center of the rotor 5, and the distance g is defined from a point on the outer surface 50 of the rotor 5 to a side wall of an adjacent winding tooth 32. As the rotor 5 rotates from having the second axis Q aligned with the adjacent winding tooth 32 to having the first axis D aligned with the adjacent winding tooth 32, the distance g becomes smaller. Here, the distance g may become smaller continuously. This arrangement can effectively reduce motor cogging torque and torque ripple during operation while controlling sharp change and saturation level of flux that passes through stator tooth tip. Further, radial electromagnetic force amplitude can be reduced, thereby efficiently controlling motor vibration and noise. In addition, motor back electromotive force can be caused to be a sine wave, thereby reducing motor harmonic current and motor iron loss.

Figure 3:
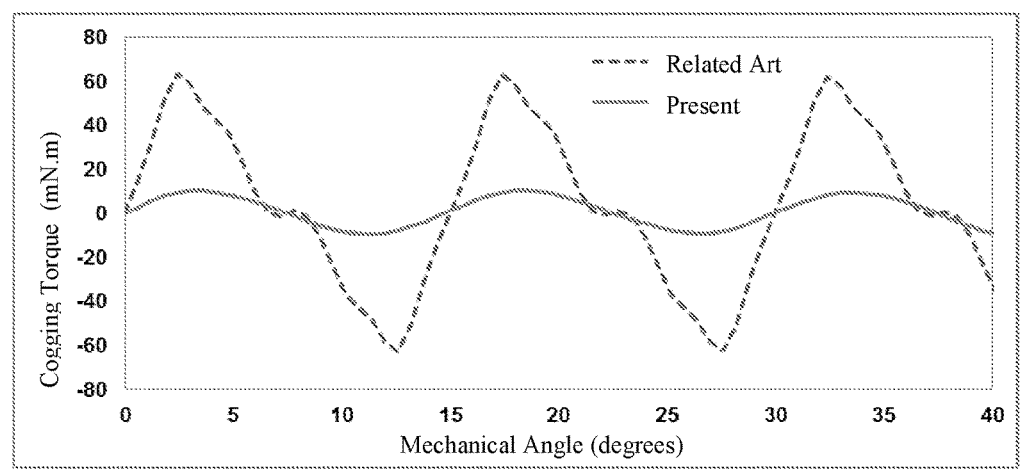
FIG. 3 is a graph showing change in the cogging torque according to mechanical angle when a stator and a rotor combination are used in the motor.

FIG. 3 is a graph showing change in the cogging torque according to mechanical angle when a stator and a rotor combination are used in the motor. FIG. 3 shows the cogging torque according to the mechanical angle of the stator relative to the rotor. In FIG. 3, the solid line represents a motor according to an example embodiment of the present invention whereas the dotted line represents a related art motor. A cogging torque closer to zero is generally better. Therefore, with regard to cogging torque, the motor according the example embodiment of the present invention has better performance than the related art motor.

Figure 4:
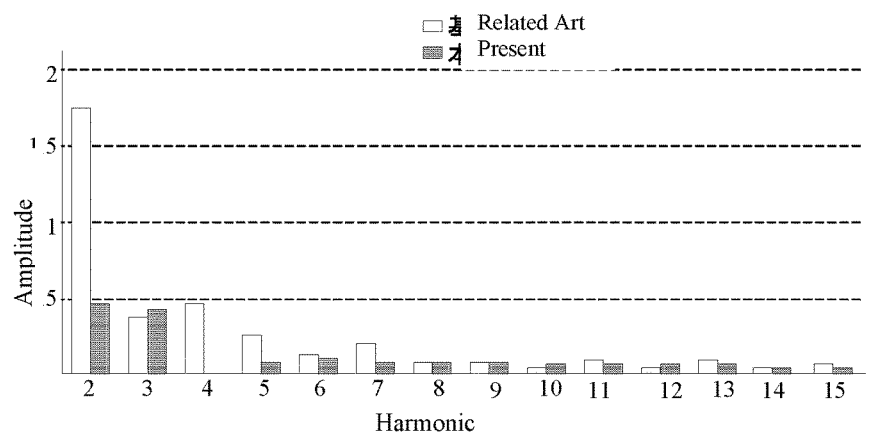
FIG. 4 is a bar graph showing different harmonic waves related to a radial magnet force distribution when a stator and a rotor combination are used in the motor.

FIG. 4 is a bar graph showing different harmonic waves related to a radial magnet force distribution when a stator and a rotor combination are used in the motor. Specifically, FIG. 4 shows different harmonics related to a radial magnet force distribution diagram for a stator and rotor combination in a motor. The cross-hatched columns represent a motor in accordance with an example embodiment of the present invention wherein the hollow columns represents a related art motor. The harmonics amplitudes for the present motor are less than those of the related art motor. Thus, motor vibration and noise are effectively restrained in the motor according to the example embodiment of the present invention.

Figure 5:
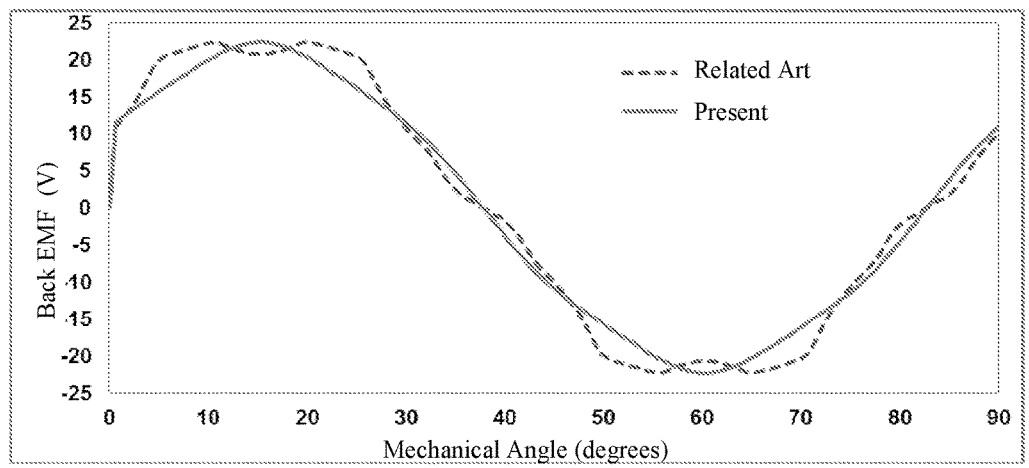
FIG. 5 is a graph showing the back electromotive force changing with mechanical angle of the motor when a stator and a rotor combination are used in the motor.

FIG. 5 is a graph showing the back electromotive force (counter electromotive force) changing with mechanical angle of the motor when a stator and a rotor combination are used in the motor. Specifically, FIG. 5 shows the back electromotive force according to the mechanical angle of the stator relative to the rotor. In FIG. 5, the solid line represents a motor according to an example embodiment of the present invention whereas the dotted line represents a related art motor. As clearly shown in FIG. 5, the back electromotive force of the present motor is a sine wave whereas the back electromotive force for the related art motor is an irregular. Because a back electromotive force with a sine wave (rather than an irregular wave) is achieved, the motor can both reduce motor harmonic current, but also reduce motor iron loss. Moreover, because the back electromotive of the present motor has a sine wave and much less high-frequency harmonics, position can be more conveniently detected.

With reference to FIG. 2, a distance g2 is defined from the outer surface 50 of the rotor 5 along the second axis Q to the side wall of the adjacent winding tooth 32. Similarly, a distance g1 is defined from the outer surface 50 of the rotor 5 along the first axis D to the side wall of the adjacent winding tooth 32. Here, distances g1 and g2 satisfy a relationship such that $1.5 \leq g2/g1 \leq 3.5$. That is, variation of the distance g is limited by limiting a ratio between a maximum of g2 and a minimum of g1, thereby controlling motor vibration and noise, and reducing motor iron loss.

In one configuration, the outer surface 50 of the rotor 5 may comprise alternating circular arcs 54 and curved inwards V shapes 55. The circular arc segments 54 and V segments 55 may be connected smoothly. The first axis passes through a center of the circular arc segments 54, and the second axis Q passes through the center of the V segments 55. In another configuration, the outer surface 50 of the rotor 5 may have other arrangements, for example, using V segments 55 of straight line segments. Since side wall of winding tooth 32 may certain radius or curvature, straight line segments can also meet the above distance g range in various ways. For example, the V segments 55 can be arc segments that rise above the center of the rotor 5 to meet the distance g range in various ways. There are many alternative configurations that can meet the distance g range in various ways not listed here. However, it is generally desired that the arc segments 54 and the V segments 55 are connected smoothly to meet the distance g range with an effectively variation amplitude so that a motor is achieved with reduced motor vibration, noise, and motor iron loss.

In FIG. 2, arc segment 54 has a radius R1, and the distance from outer surface 50 to the center of the rotor 5 along the first axis D is R2 such that R1<R2 and R1>0. Further, the arc segment 54 defines an angle θ1, and the rotor 5 has a number P of poles (magnets) such that $0.444 \leq \theta1/(360°/P) \leq 0.665$ and P is a natural number.

Specifically, if the distance variation range between the side wall of the adjacent winding tooth 32 and each point on arc segment 54 adopting R1 and θ1 as set forth, motor vibration, noise, and motor iron loss may be reduced.

Figure 6:
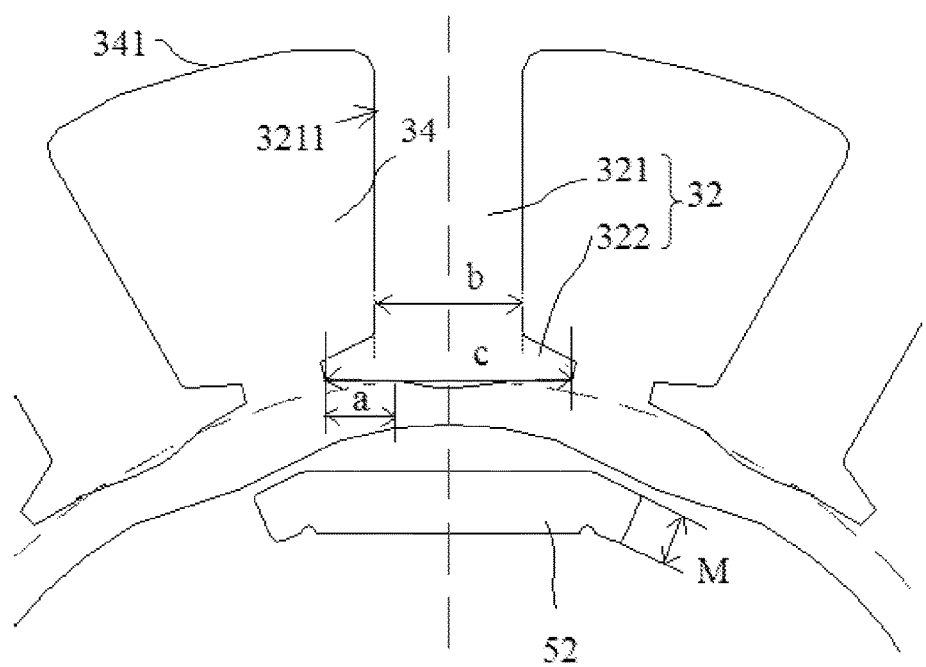
FIG. 6 is an enlarged partial diagrammatic view showing the stator and rotor combination of FIGS. 1 and 2.

FIG. 6 is an enlarged partial diagrammatic view showing the stator and rotor combination of FIGS. 1 and 2.

As shown in FIG. 6, a winding tooth 32 may comprise a winding portion 321 and front portion 322. Here, the surface of the front portion 322 can be straight or curved. To increase the distance variation range between the side wall (i.e., the front portion 322) of the winding tooth 32 and point on outer surface 50 of the rotor 5, a contoured front portion 322 may be used. The contoured front portion 322 includes an arc segment at the center part and two straight line segments connected to respective ends of the arc segment. In the illustrated embodiment, the distance c is defined between two endpoints of the contoured front portion 322 (i.e., a width of the front portion 322). Each straight line segment has a length a. The winding portion 321 has a width b. Here, these dimensions satisfy a relationship: $(c-b)/2 \leq a \leq c/2$ where a, b, and c are greater than zero. The relative dimensions of a, b, and c as described can provide a sufficient arc segment length for the front portion 322 such that a sufficient variation in distance g is provided.

In the example of FIG. 6, two adjacent winding teeth 32 have a stator slot 34 in between. The base 341 of the stator slot 34 described herein comprises the arc segment of the stator slot and two straight lines of the stator slot connecting two ends of the arc segment of the stator slot described herein. The straight line segment of the stator slot is perpendicular to the side line 3211 of the winding portion 321 and the straight line segment of the stator slot is connected with the side line 3211 smoothly. Of course, in other configurations, the base 341 of the stator slot 34 can be composed by only an arc segment or by only a straight line segment.

In variations in accordance with the present invention, the rotor core 51 can comprise rotor lamination with multiple layers, and/or the stator core 31 can comprise stator lamination with multiple layers. In the lamination layers, the lamination can include a magnetic steel sheet.

In accordance with FIG. 6, the length of assembly slot 53 may be larger than the magnet 52. Here, the magnet 52 may be at the center of assembly slot 53 and the two sides of assembly slot 53 may have magnet barrier 56 (shown in FIG. 7) composed by non-magnetic zone. The width M of magnet barrier 56 is 1.5-3.0 times of rotor lamination thickness. The above design may ensure mechanical strength, meanwhile set width M of magnet barrier 56 is 1.5-3.0 times of rotor lamination thickness. This arrangement effectively restrains a magnetic field short circuit that may be formed by a magnetic field produced from magnet passing through the winding tooth 32 and magnet barrier 56, thereby achieving increased magnet utilization and motor efficiency.

In the above example configuration, the number of winding teeth 32 and the number of poles in the rotor 5 has a ratio of 3:2. Therefore, the example configuration can effectively increase stator slot utilization by adopting fractional-slot design for stator and rotor combination structure. Of course, this ratio represents only an example configuration, and the ratio between the number of winding teeth 32 and the number of poles in the rotor 5 can have other values. Further, the number of winding teeth 32 and the number of poles in the rotor 5 can be determined in accordance with actual design and manufacturing demands.

Figure 7:
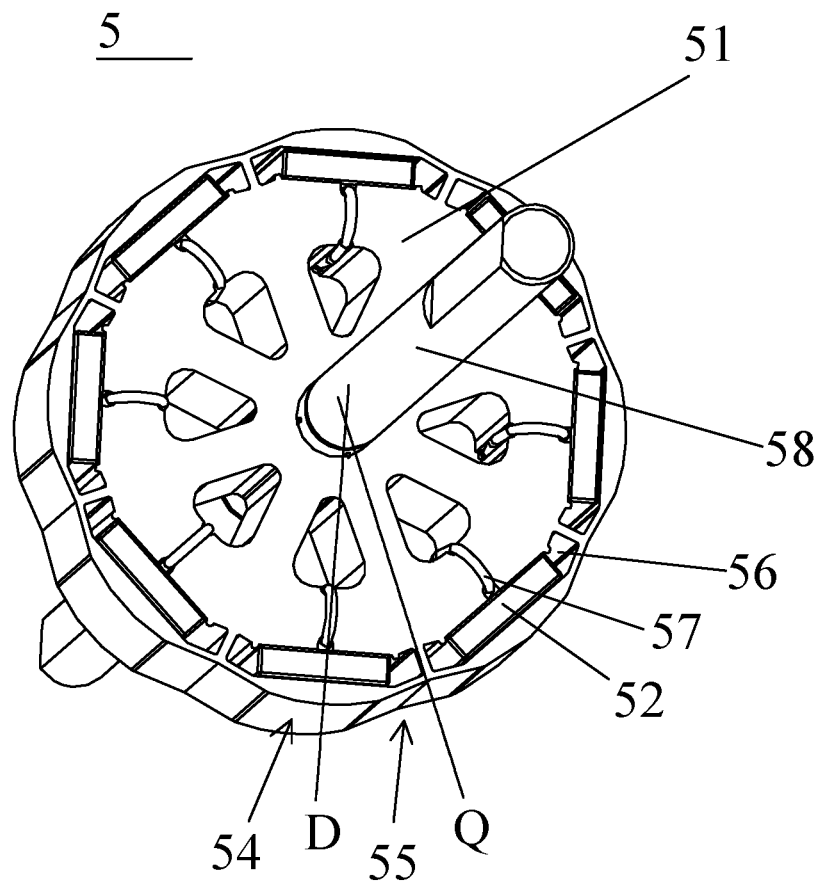
FIG. 7 is perspective view showing a rotor in accordance with an example embodiment.

FIG. 7 is perspective view showing a rotor 5 in accordance with an example embodiment. As shown in FIG. 7, the magnet 52 may be fastened into the assembly slot 53 by a fastener 57, such as a clip. Furthermore, the rotor 5 may also comprise a shaft 58 with the rotor core 51 therearound. Alternatively, other arrangements may be used to fasten the magnets. For example, the magnet 52 may be secured into the assembly slot 53 by endcaps (not shown) on each side of the rotor so that the magnet cannot shift along the axial direction. The endcaps may be made of stainless steel to avoid a flux leakage path.

Not only the fractional slot structure as shown herein, but also a concentrated winding design to reduce winding length, can help reduce resistance and increase motor efficiency. In addition, embedded style permanent magnet rotor structure may be adopted to obtain enough mechanical strength and stability without fasteners or other auxiliary mechanisms. Furthermore, embodiments can take advantage of reluctance torque produced from rotor saliency to material utilization.

In accordance with the example embodiments described herein, a brushless motor may comprise a rotor and a stator around the rotor. The stator may include a plurality of tooth portions facing the rotor and having windings around each. The rotor may include magnets facing the stator.

The stator and the rotor have a configuration such that the separation distance is not constant around their interface. As shown in FIGS. 2 and 6, for example, the contour of the rotor includes alternately located circular arc segments and inward curved V-segments. Thus, a distance "g" between the stator and the rotor decreases from a position corresponding to the center of a rotor magnet to a position between rotor magnets.

This example configuration can effectively reduce motor cogging torque and torque ripple during operation while controlling sharp change and saturation level of flux that passes through stator tooth tip. Further, radial electromagnetic force amplitude may be reduced, thereby efficiently controlling motor vibration and noise. In addition, B-EMF (back electromotive force) of the motor becomes more of a sine wave, thereby reducing current harmonic and iron loss in the motor.

It will be apparent to those skilled in the art that various modifications and variations can be made in the brushless motor of the present invention without departing from the spirit or scope of the invention. Thus, it is intended that the present invention cover the modifications and variations of this invention provided they come within the scope of the appended claims and their equivalents.

What is claimed is:

1. A brushless motor, comprising:
a stator including a stator core and a plurality of winding teeth evenly distributed on the stator core; and
a rotor rotatably disposed within the stator with the winding teeth facing the rotor, the rotor including a rotor core and a plurality of magnets evenly distributed around the rotor core,
wherein a first symmetry axis is defined passing through a center of a first one of the magnets to a center of the rotor, and a second symmetry axis is defined passing between adjacent ones of the magnets to the center of the rotor,
wherein a first distance between an outer surface of the rotor to a surface of a first one of the winding teeth when the first axis is aligned with the first winding tooth is smaller than a second distance between the outer surface of the rotor to the surface of the first winding tooth when the second axis is aligned with the first winding tooth,
wherein each winding tooth includes a coil wound portion and a front portion facing the rotor at an end of the coil wound portion,
wherein a surface of the front portion has an arc segment at a center part and two straight line segments connected to respective ends of the arc segment, and
wherein a length of each straight line segment, a width of the winding portion, and a width of the front portion are configured to satisfy:

$$(c-b)/2 \leq a \leq c/2$$

where 'a' is the length of each straight line segment, 'b' is the width of the winding portion, and 'c' is the width of the front part.

2. The brushless motor according to claim 1, wherein a distance between the outer surface of the rotor to the surface of the first winding tooth becomes smaller as the rotor rotates from a state with the second axis being aligned with the first tooth to a state with the first axis being aligned with the first tooth.

3. The brushless motor according to claim 1, wherein a distance between the outer surface of the rotor to the surface of the first winding tooth becomes continuously smaller as the rotor rotates from a state with the second axis being aligned with the first tooth to a state with the first axis being aligned with the first tooth.

4. The brushless motor according to claim 1, wherein the rotor and the stator are configured such that the first and second distances satisfy $$1.5 \leq g2/g1 \leq 3.5$$

where g1 is the first distance and g2 is the second distance.

5. A brushless motor according to claim 1, wherein the outer surface of the rotor includes alternating circular arc segments and curved inward V shaped segments that are smoothly connected, wherein the first axis passes through a center of one of the circular arc segments, and wherein the second axis passes through a center of one of the curved inward V shaped segments.

6. A brushless motor according to claim 5, wherein each of the circular arc segments has an arc radius R1 which is greater than a distance R2 defined from a center of the circular arc segment to a center of the rotor.

7. A brushless motor according to claim 5, wherein an angle of each of the circular arc segments relative to the center of the rotor satisfies $$0.444 \leq \theta 1/(360°/P) \leq 0.665$$

where θ1 is the angle and P is the number of magnets distributed around the rotor core.

8. The brushless motor according to claim 1, wherein a stator slot is defined between two adjacent winding teeth portions,
wherein a base of the stator slot includes an arc segment and two straight lines connected to respective ends of the arc segment, and
wherein each straight line segment is perpendicular to and smoothly connected to an adjacent side wall of the coil wound portion.

9. The brushless motor according to claim 1, wherein a ratio of a number of winding teeth to a number of poles distributed around the rotor core is 3:2.

10. The brushless motor according to claim 1, wherein magnets are disposed in mounting slots evenly distributed around the rotor core.

11. The brushless motor according to claim 10, wherein the rotor core includes rotor lamination, and wherein the stator core includes stator lamination.

12. The brushless motor according to claim 11, wherein a length of each mounting slot is greater than a length of each respective magnet, and each magnet is disposed at a center of each mounting slot,
wherein flux barriers are at each side of each respective mounting slot, and
wherein a width of the flux barrier is 1.5~3 times of the thickness of the rotor lamination.

13. The brushless motor according to claim 10, wherein the magnets are fastened into respective ones of the mounting slots by a fastening clip.

14. The brushless motor according to claim 1, wherein the magnets are along an outer surface of the rotor to be within the rotor inside of the outer surface.

15. A brushless motor, comprising:
a stator including a stator core and a plurality of winding teeth evenly distributed on the stator core; and
a rotor rotatably disposed within the stator with the winding teeth facing the rotor, the rotor including a rotor core and a plurality of magnets evenly distributed around the rotor core,
wherein a first symmetry axis is defined passing through a center of a first one of the magnets to a center of the rotor, and a second symmetry axis is defined passing between adjacent ones of the magnets to the center of the rotor,
wherein a first distance between an outer surface of the rotor to a surface of a first one of the winding teeth when the first axis is aligned with the first winding tooth is smaller than a second distance between the outer surface of the rotor to the surface of the first winding tooth when the second axis is aligned with the first winding tooth,
wherein the rotor and the stator are configured such that the first and second distances satisfy:

$$1.5 \leq g2/g1 \leq 3.5$$

where g1 is the first distance and g2 is the second distance,
wherein magnets are disposed in mounting slots evenly distributed around the rotor core,
wherein a length of each mounting slot is greater than a length of each respective magnet, and each magnet is disposed at a center of each mounting slot,
wherein flux barriers are at each side of each respective mounting slot, wherein each winding tooth includes a coil wound portion and a front portion facing the rotor at an end of the coil wound portion, wherein a surface of the front portion has an arc segment at a center part and two straight line segments connected to respective ends of the arc segment, and wherein a length of each straight line segment, a width of the winding portion, and a width of the front portion are configured to satisfy:

$$(c-b)/2 \le a \le c/2$$

where 'a' is the length of each straight line segment, 'b' is the width of the winding portion, and 'c' is the width of the front part.

16. The brushless motor according to claim 15, wherein a distance between the outer surface of the rotor to the surface of the first winding tooth becomes smaller as the rotor rotates from a state with the second axis being aligned with the first tooth to a state with the first axis being aligned with the first tooth.

17. The brushless motor according to claim 15, wherein a distance between the outer surface of the rotor to the surface of the first winding tooth becomes continuously smaller as the rotor rotates from a state with the second axis being aligned with the first tooth to a state with the first axis being aligned with the first tooth.

18. The brushless motor according to claim 15, wherein the outer surface of the rotor includes alternating circular arc segments and curved inward V shaped segments that are smoothly connected, wherein the first axis passes through a center of one of the circular arc segments, and wherein the second axis passes through a center of one of the curved inward V shaped segments, wherein each of the circular arc segments has an arc radius R1 which is greater than a distance R2 defined from a center of the circular arc segment to a center of the rotor, and wherein an angle of each of the circular arc segments relative to the center of the rotor satisfies $$0.444 \le \theta1/(360°/P) \le 0.665$$

where θ1 is the angle and P is the number of magnets distributed around the rotor core.

19. The brushless motor according to claim 15, wherein a stator slot is defined between two adjacent winding teeth portions, wherein a base of the stator slot includes an arc segment and two straight lines connected to respective ends of the arc segment, and wherein each straight line segment is perpendicular to and smoothly connected to an adjacent side wall of the coil wound portion.

* * * * *